United States Patent
Hoban et al.

(10) Patent No.: US 12,504,959 B2
(45) Date of Patent: Dec. 23, 2025

(54) LANGUAGE-NEUTRAL PACKAGE SCHEMA FOR A DESIRED STATE CONFIGURATION SYSTEM

(71) Applicant: Pulumi Corporation, Seattle, WA (US)

(72) Inventors: Lucas James Hoban, Seattle, WA (US); Patrick Duncan Gavlin, Seattle, WA (US); Justin Robert Van Patten, Redmond, WA (US)

(73) Assignee: Pulumi Corporation, Seattle, WA (US)

( * ) Notice: Subject to any disclaimer, the term of this patent is extended or adjusted under 35 U.S.C. 154(b) by 272 days.

(21) Appl. No.: 18/312,306

(22) Filed: May 4, 2023

(65) Prior Publication Data
US 2024/0370243 A1   Nov. 7, 2024

(51) Int. Cl.
*G06F 8/51* (2018.01)
*G06F 8/20* (2018.01)
*G06F 8/30* (2018.01)

(52) U.S. Cl.
CPC ............ *G06F 8/51* (2013.01); *G06F 8/20* (2013.01); *G06F 8/31* (2013.01)

(58) Field of Classification Search
CPC ............. G06F 8/51; G06F 8/31; G06F 8/20
See application file for complete search history.

(56) References Cited

U.S. PATENT DOCUMENTS

| | | | | |
|---|---|---|---|---|
| 7,322,022 B2* | 1/2008 | Al-Azzawe | ............... | G06F 8/00 707/999.102 |
| 8,266,586 B2* | 9/2012 | Wang | ............... | G06Q 10/10 717/104 |
| 8,806,425 B1* | 8/2014 | Willis | ............... | G06F 8/35 717/106 |
| 2022/0342646 A1* | 10/2022 | Ayyalasomayajula | .... | G06F 8/36 |
| 2024/0248690 A1* | 7/2024 | O'Farrell | .......... | G06F 8/71 |
| 2025/0013443 A1* | 1/2025 | Fischer | ............ | G06F 8/43 |

OTHER PUBLICATIONS

Pulumi, "Pulumi vs Terraform," Undated, 13 pages, [Online] [Retrieved on Jun. 9, 2023] Retrieved from the Internet <URL: https://www.pulumi.com/docs/concepts/vs/terraform/>.
Pulumi, "Chef, Puppet, Ansible, & Salt vs Pulumi," Undated, 2 pages, [Online] [Retrieved on Jun. 9, 2023] Retrieved from the Internet <URL: https://www.pulumi.com/docs/concepts/vs/k8s-yaml-dsls/>.

(Continued)

*Primary Examiner* — Wei Y Zhen
*Assistant Examiner* — Amir Soltanzadeh
(74) *Attorney, Agent, or Firm* — Fenwick & West LLP

(57) ABSTRACT

A desired state configuration system receives a package and a corresponding language-independent schema describing the package and its units. Using the schema, the desired state configuration system can generate wrapper code for each of the programming language supported by the desired state configuration system, the wrapper code simplifying calling of the package and its units from within application code written in those supported programming languages. The code of the package, when called, causes a change in the configuration of a target environment, such as a cloud computing environment.

20 Claims, 4 Drawing Sheets

(56) References Cited

OTHER PUBLICATIONS

Pulumi, "Cloud Template Transpilers," Undated, 2 pages, [Online] [Retrieved on Jun. 9, 2023] Retrieved from the Internet <URL: https://www.pulumi.com/docs/concepts/vs/cloud-template-transpilers/>.

Pulumi, "Pulumi vs Cloud templates," Undated, 2 pages, [Online] [Retrieved on Jun. 9, 2023] Retrieved from the Internet <URL: https://www.pulumi.com/docs/concepts/vs/cloud-templates/>.

Pulumi, "Pulumi vs custom infra-as-code solutions," Undated, 2 pages, [Online] [Retrieved on Jun. 9, 2023] Retrieved from the Internet <URL: https://www.pulumi.com/docs/concepts/vs/custom/>.

Pulumi, "Pulumi vs Kubernetes YAML, Helm Charts and DSLs," Undated, 2 pages, [Online] [Retrieved on Jun. 9, 2023] Retrieved from the Internet <URL: https://www.pulumi.com/docs/concepts/vs/k8s-yaml-dsls/>.

Pulumi, "Pulumi vs. AWS Boto and Cloud SDKs," Undated, 2 pages, [Online] [Retrieved on Jun. 9, 2023] Retrieved from the Internet <URL: https://www.pulumi.com/docs/concepts/vs/cloud-sdks/>.

Pulumi, "Pulumi vs. Serverless Framework," Undated, 2 pages, [Online] [Retrieved on Jun. 9, 2023] Retrieved from the Internet <URL: https://www.pulumi.com/docs/concepts/vs/serverless/>.

\* cited by examiner

LANGUAGE-NEUTRAL PACKAGE SCHEMA FOR A DESIRED STATE CONFIGURATION SYSTEM

TECHNICAL FIELD

The disclosed embodiments generally relate to desired state configuration. In particular, the disclosed embodiments describe schemas for defining and using packages in a language-neutral way to perform desired state configuration management.

BACKGROUND

A desired state configuration system facilitates causing a target environment, such as a cloud-based environment, to have a particular desired state. For example, a particular cloud-based target environment could be made to have a specified number of virtual servers, with specified communication paths between them, and specified data in storage buckets. However, it can be extremely cumbersome to specify all the instructions and other data required to specify a desired system state, particularly across the various different programming languages that may be used within a state configuration project.

The figures depict various embodiments of the present technology for purposes of illustration only. One skilled in the art will readily recognize from the following description that other alternative embodiments of the structures and methods illustrated herein may be employed without departing from the principles of the technology described herein.

DETAILED DESCRIPTION

A desired state configuration system allows users to specify the desired state of their systems and manages the systems to make them conform to that desired state. This simplifies the system administration required to achieve the desired state, which would otherwise be a very manual and error-prone process.

Figure 1:
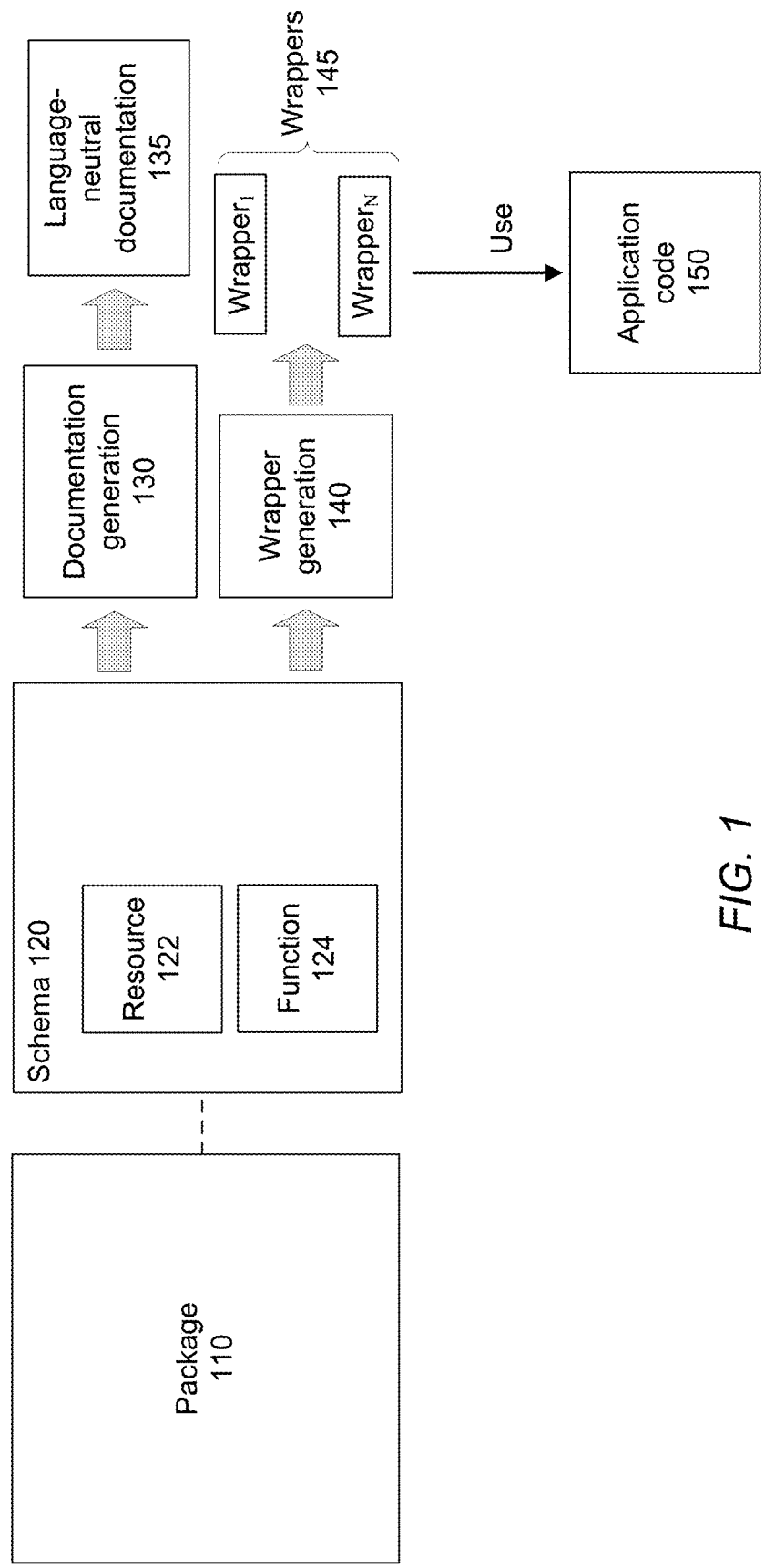
FIG. 1 illustrates elements of, or generated by, a desired state configuration system, according to some embodiments.

FIG. 1 illustrates elements of, or generated by, a desired state configuration system, according to some embodiments. A user authors a package 110, which is software written in a particular programming language that alters a target system to achieve a desired state. A user can also specify a schema 120, which describes the contents and functionality of the various units of the package (which may include units such as resources 122 and/or functions 124) in a programming language-neutral manner—that is, using a syntax that is not specific to any particular programming language. Modules of the desired state configuration system can use the schema 120 to generate supporting infrastructure that simplifies use of the package 110. For example, for any designated language supported by the desired state configuration system, a documentation generation module 130 generates documentation 135 that lists a human-readable description of an application programming interface (API) for the package 110 in that language, and a wrapper generation module 140 generates wrapper code 145 that enables using the package in code written in that language. For instance, an application 150 written in a particular programming language can use the wrapper 145 generated for that programming language to make use of the package.

Figure 2:
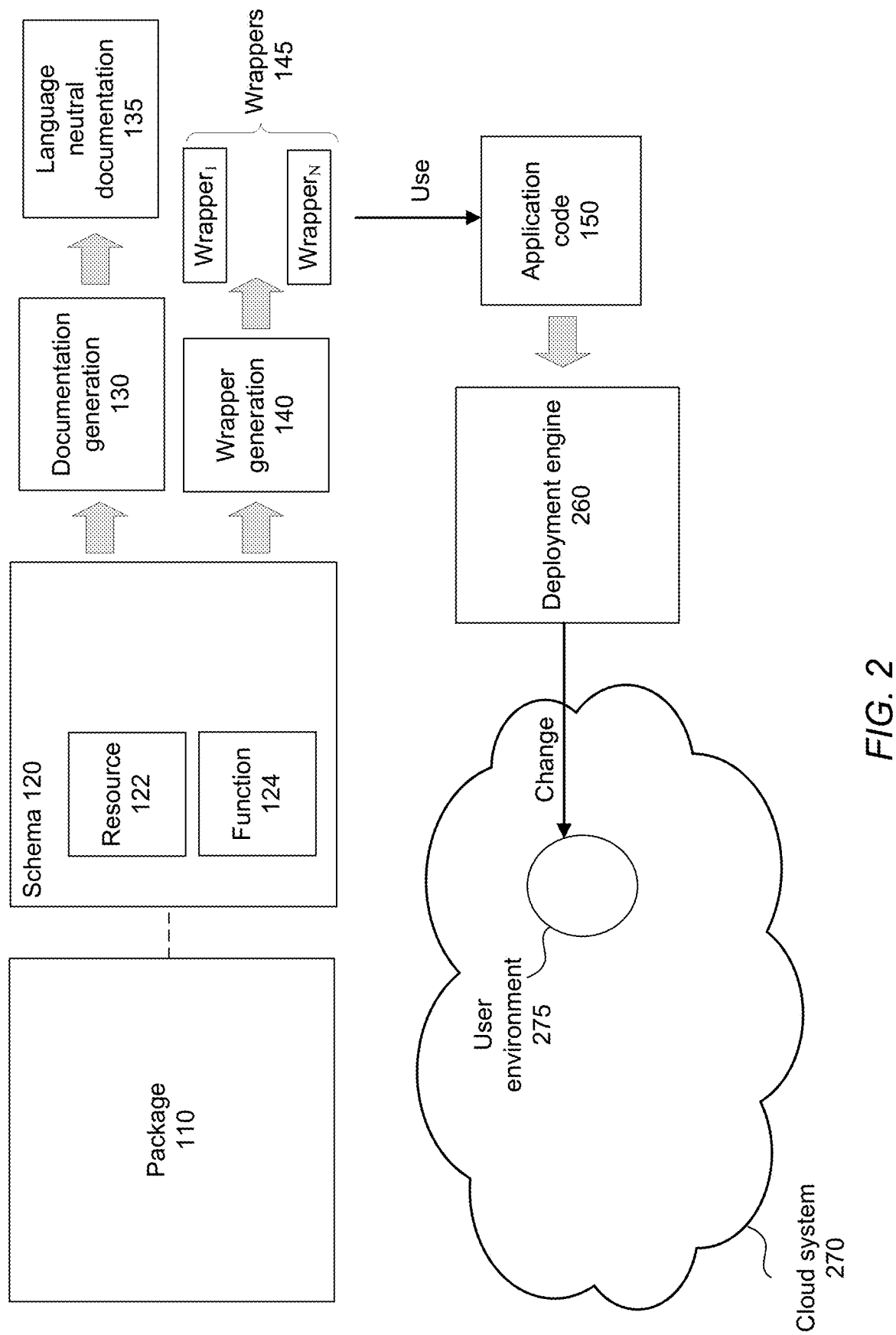
FIG. 2 illustrates elements similar to those of FIG. 1, in the context of controlling the state of a cloud-based environment, according to some embodiments.

FIG. 2 illustrates elements similar to those of FIG. 1, in the context of controlling the state of a cloud-based environment, according to some embodiments. A cloud system 270 operates in a multi-tenant fashion, providing environments for the many different users and/or organizations who have accounts on the cloud system; the user environment 275 of FIG. 2 denotes the portion of the cloud environment 270 to which a particular user or organization has access. The package 110 includes code that alters the user environment 275, such as creating and configuring virtual hosts, storage buckets, and web pages within the portion of Amazon AWS™ allocated to the user. The application code 150 calls the code within one or more packages 110 via the wrapper 145 generated in the language of the application code 150. (E.g., if the application code 150 is written in C#, a C# wrapper 145 is used.) The application code 150 is run by a deployment engine 260 of the desired state configuration system, which determines the desired state specified by the application code, determines what the current system state of the user environment 275 allocated to the user is, determines what operations need to be performed by transforming the current system state to the desired state, and sends instructions to the cloud system 270 that perform those operations. For instance, a prior version of the application code 150 may previously have configured the user environment 275 to contain 4 virtual hosts, and the current version of the application code 150 may specific 5 virtual hosts, in which case the deployment engine 260 would determine that one additional virtual host is now required and cause the cloud system 270 to create that additional virtual host within the user environment 275.

Figure 3:
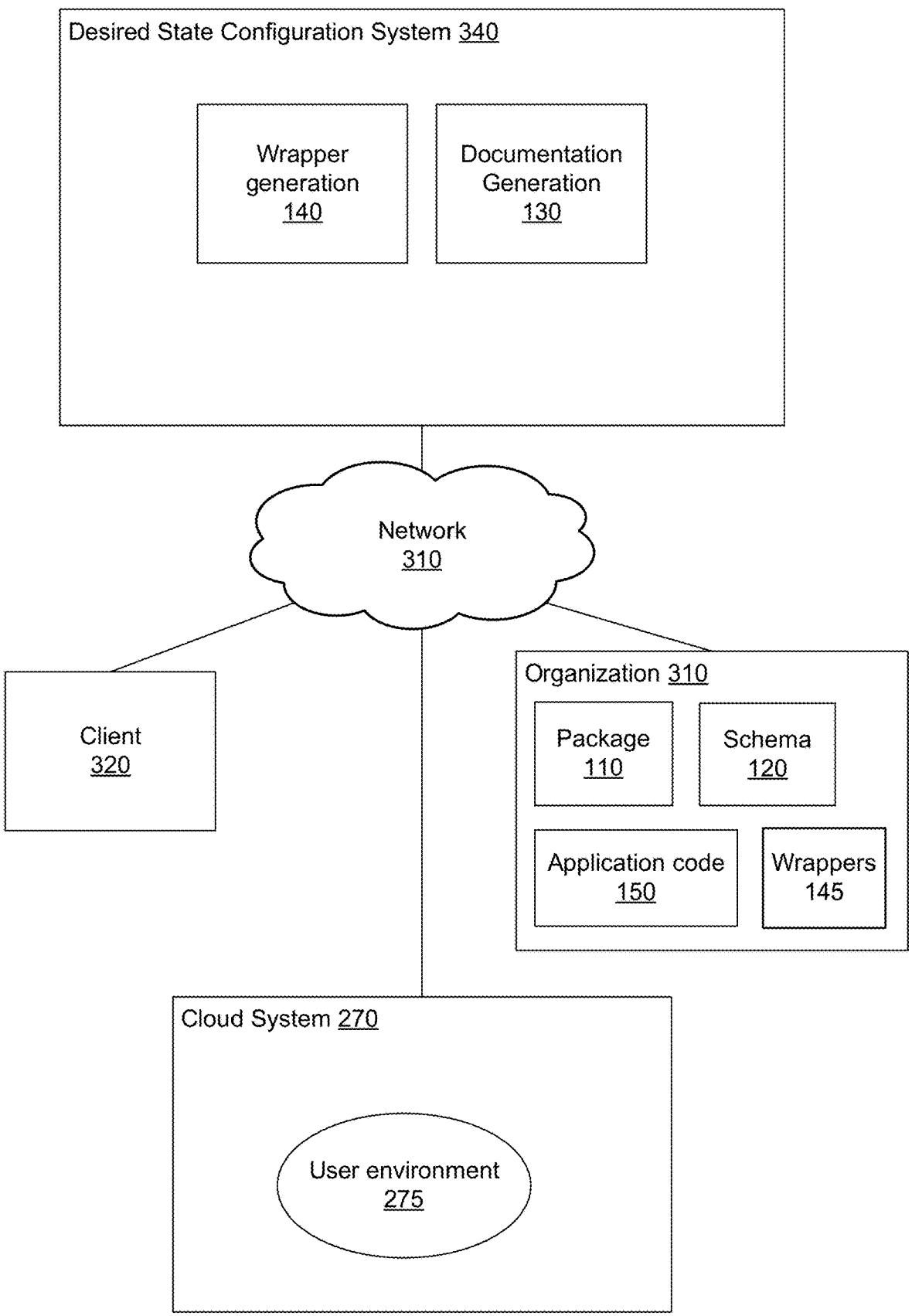
FIG. 3 illustrates a system environment including the elements of FIGS. 1 and 2, according to some embodiments.

FIG. 3 illustrates a system environment including the elements of FIGS. 1 and 2, according to some embodiments. An organization 310 has access to a user environment 275 on a cloud system 270 and uses a desired state configuration system 340 to facilitate ensuring that the user environment 275 is in a particular desired state. To this end, software engineers 310 (either those of the organization 310, or of a third-party organization) create packages 110 that can be used to manipulate the user environment 275, and corresponding schemas 120 that describe the contents and functionality of the packages. The software engineers of the organization 310 provide the schemas 120 as input to a wrapper generation module 140, which analyzes the schemas and generates (for each of the schemas) a set of wrappers 145, each corresponding to a different programming language supported by the desired state configuration system 340, so that the package 110 can be used from any of the supported languages.

In some embodiments, the wrapper generation module 140 generates wrappers 145 using the following transformations: 1. Type tokens are mapped into nested namespaced resources and types (nested by module name in the type token). 2. Functions are mapped into module-level functions 3. Resources are mapped into types with constructors (e.g., classes in languages which have such a combined notion). 4.

Each resource and function has a bag of strongly typed inputs and outputs. 5. These inputs are derived from the schema but deeply wrapped in type "Input" (which can be either a raw value (e.g., string, integer, Boolean, list map, etc.), an asynchronously computed value (e.g., a Promise or Task), or an output read from another resource's values) to allow accepting either known value or values dependent on other resources. 6. Outputs for resources are represented as properties on a class/type. 7. Outputs are represented as the schema type wrapped in type "Output," making clear that their values are not necessarily known until they are created/updated.

In some embodiments, the wrapper generation module 140 generates a general (static) "get" function for a package that allows obtaining an instance of a resource of the type represented by that package, where the instance is not yet managed by the desired state configuration system 340. This effectively permits the code of one package to import and use an instance not created through the desired state configuration system 340. As one example, the Python code for a first package could contain the line group=aws.ec2.SecurityGroup.get('group', 'sg-0dfd33cdac25bec9'), which obtains a reference to an existing instance of an Amazon™ Elastic Compute Cloud™ security group with AWS™ ID "sg-0dfd33cdac25b1ec9'" using the static "get( )" function. In one embodiment, the get function takes an argument specifying the ID within the source cloud system of the instance to be obtained, and another argument specifying a name for that object (e.g., "group") when accessed by packages managed by the desired state configuration system 340.

The schemas 120 may also be input to a documentation generation module 130, which produces documentation for human perusal for each of various programming languages supported by the desired state configuration system 340. The documentation generation module 130 presents the interface in terms of the desired state configuration model using resources and functions, including examples and descriptions of those resources/functions and of properties thereof. In some embodiments, documentation for a package is provided on a web page or other document with separate sections for different examples and different syntax, with choices of language-specific instances for each. For example, the multi-language documentation for a package named "aws.ec2.Instance" might indicate that for the Go programming language the syntax for creating a new instance is "func NewInstance (ctx *Context, name string, args *InstanceArgs, opts . . . ResourceOption) (*Instance, error)"; clicking on a neighboring tab for "C#" would in turn indicate that the syntax for creating a new instance in C# is "public Instance (string name, InstanceArgs ?args=null, CustomResourceOptions? opts=null)." Thus, documentation for all the supported languages is provided within a single web page or other document, with the various concepts each providing syntax or other examples for each of the supported languages.

Software engineers of the organization 310 also author application code 150 that uses the packages 110 to create and/or modify the state of the user environment 275. Specifically, the application code 150 uses the wrappers 145 generated by the wrapper generation module 140—and more specifically, the wrapper for the programming language in which the application code 150 is written—to call the code in the corresponding package 110.

Appendix A, below, provides a simple example of a schema ("schema.yaml") for a particular resource component (defined by "staticPage.go"), where a wrapper ("staticPage.ts") is generated based on the schema and called from application code ("index.ts").

Appendix B, below, lists formats for schemas, according to some embodiments. In these embodiments, schemas may describe a number of units, such as packages 110, resources 122, functions 124, types, properties, and the like. For example, the schema of Appendix A describes a resource named "StaticPage," using a map data structure defined in superset of JSON to specify attributes as a set of keys and values. The schema has a number of attributes that provide information about the units described in the schema, such as the "name" attribute with the atomic value "xyz" (indicating that the name of the described package is "xyz"), the "resources" attribute (which in turn has a map data structure as its value), and the like. A package 110 is said to implement the schema corresponding to it if its data matches the structure specified by the schema as a whole, and a unit of a package (e.g., a resource) is said to implement the schema if its data matches the structure specified by the corresponding portion of the schema (e.g., the portion of the schema defining a resource). Packages match their respective schemas (and units of packages match their respective schema portions) if they satisfy the various implicit or explicit assertions of the schema, such as that all input to the package or unit is of the types (or compatible subtypes thereof) specified for the input in the schema; all output form the package is of the types (or compatible subtypes) specified for the output in the schema; all required properties of a package's resources are marked in the schema as being required inputs; and all resources and function specified in the schema have an implementation in the package.

Schemas for packages 110 define information such as (but not limited to) package name and version; the license under which the package is made available for use by others; the URL at which the source code for the package is made available; object types that the package defines; resources 122 that the package defines; functions 124 that the package defines; and language-specific data about the package.

Schemas for object types define information about new types that have been created and are being made available for use by other code. Such information can include (but is not limited to): any required input properties or output properties of the object type; metadata describing the different properties (including types and informational data such as human-readable descriptions); and data about the type that is specific to a particular programming language.

Schemas for resources 122 define information about a particular resource in the target environment (e.g., a storage bucket in a cloud environment). The information can include (but is not limited to): any required input properties for creating the resource; whether the resource represents a single resource maintained by the provider of the target environment, or is a composite of many such resources; any functions 124 of the resource 122; and data about the resource that is specific to a particular programming language.

Schemas for functions 124 define information about functions that may be executed in a programming language. The information can include (but is not limited to): a list of any input properties for calling the function; a list of any output properties resulting from the function call; and data about the function that is specific to a particular programming language.

Schemas for properties define information about particular input or output variable properties, such as whether a particular property has a constant (fixed) value, or a default value; whether the property is secret; and data about the property that is specific to a particular programming language.

The "language" property describing attributes that are specific to a particular programming may specify languages such as Node.js, Python, Go, C#, or Java, and may relate to aspects such as any dependencies; compatibility; paths for package imports; namespaces in which the package or other item should be included.

In some embodiments, the output properties of units such as resources 122 and functions 124 are evaluated asynchronously, given that the cloud system 270 may perform non-trivial amounts of operations to create or modify components within the user environment 275. Further, dependencies between output data and the input data that led to it can be tracked. In some embodiments, the output properties are of a special data type, such as "Output[T]" (where "T" represents a templated data type), where that data type contains references to the input sources resulting in the output, as well as the value of the output itself. In this way, input and output operations result in a dependency graph through which the flow of the data may be traced from the original inputs, through intermediate outputs, to the ultimate outputs. In some embodiments, the handling of special output data types, and the formation of the dependency graph, is handled by the code of the wrappers 145.

The existence of the dependency graph enables a number of different useful operations. As a first example, the dependency graph supports the ability to run a Preview within the desired state configuration system 340. A proposed change to the desired state can be "previewed" by evaluating the application code 150 without actually making any changes, and instead treating all 'Output' values as "unknown." These unknown values can propagate into dependencies so that the preview can indicate which resource may impact the input to another resource, without having to yet know what the actual values will be (since that won't be known until the change is actually made). This allows users of the system 340 to carefully validate the impact of changes before they are made. As a second example, the dependency graph enables the ability to deterministically delete resources managed by the desired state configuration system 3 based on the dependency graph. Resources can be deleted in reverse-dependency-order to ensure that a resource is deleted before anything that depends on it, thereby ensuring safe and correct deletion. As a third example, in order to effect replacements of resources, in some cases, a replacement of the resource will be created, then resources dependent on it will be updated to point to the new resource, then the old instance will be deleted. This uses the dependency graph directly, but must also compose with the potential replacement of any of the dependent resources recursively, leading to a non-trivial subgraph of replacements that must be processed in a nested form before the deletion of the "old" instances in reverse order.

In some embodiments, a schema 120 has properties with values that reference separate schemas as a way to more succinctly define a data type. For example, in the schema of Appendix A, the excerpted lines bucket:
"$r e f":
"/aws/v4.0.0/schema.json#/resources/aws:s3%2Fbucket: Bucket" indicate that the API for the enclosing resource is defined in the schema that can be found at the URI/aws/v4.0.0/schema.json#/resources/aws:s3%2Fbucket:Bucket, where the "aws" and "v4.0.0" portions of the URI can be used as keys to look up the schema in a well-known schema registry. A more succinct notation omitting the path can also be employed to reference a schema defined within a different portion of the same schema, such as the value "#/types/apigateway:index:EventHandlerRoute" referring to the key "apigateway:index:EventHandlerRoute" under the top-level "types" key in the current schema. Note that portions of the URI such as "/resources" and "/types" correspond to portions of the schema's structure and can thus indicate particular portions of the schema (e.g., the resource with identifier "aws:s3%2Fbucket:Bucket", or the type named "apigateway:index:EventHandlerRoute."

Figure 4:
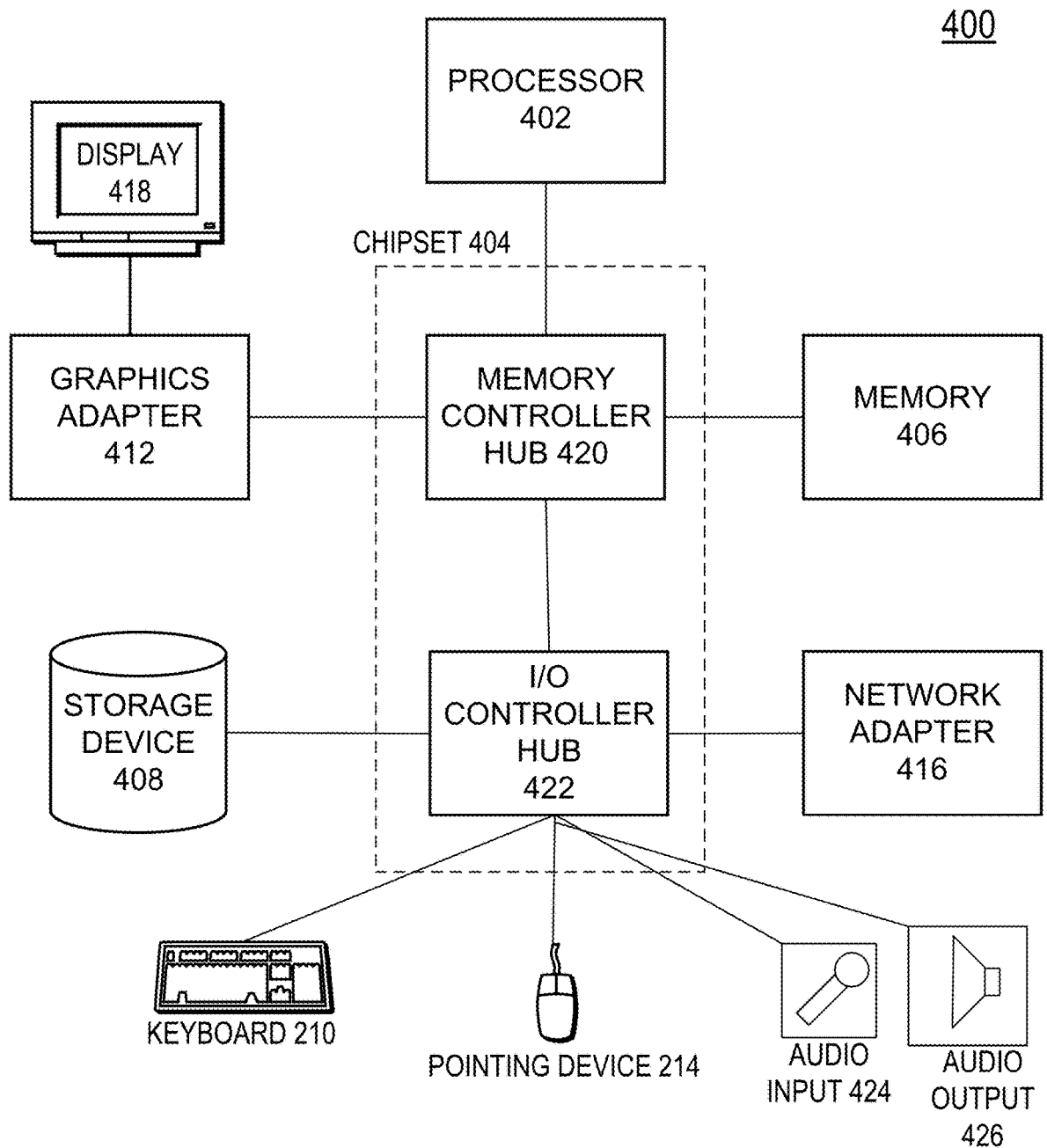
FIG. 4 is a high-level block diagram illustrating physical components of a computer used as part or all of the desired state configuration system, client device, cloud system, or system for the organization from FIG. 1, according to one embodiment.

FIG. 4 is a high-level block diagram illustrating physical components of a computer 400 used as part or all of the desired state configuration system 340, client device 320, cloud system 270, or system for organization 310 from FIG. 1, according to one embodiment. Illustrated are at least one processor 402 coupled to a chipset 404. Also coupled to the chipset 404 are a memory 406, a storage device 408, a graphics adapter 412, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The graphics adapter 412 displays images and other information on the display 418. The network adapter 416 couples the computer 400 to a local or wide area network. The keyboard 410 and pointing device 414 allow a user to manually provide input. The audio input (e.g., microphone) 424 and output (e.g., internal or external speaker) 426 provide the ability obtain sound input (e.g., for speech recognition) and produce sound output.

As is known in the art, a computer 400 can have different and/or other components than those shown in FIG. 4. In addition, the computer 400 can lack certain illustrated components. In one embodiment, a computer 400 acting as a server may lack a graphics adapter 412, and/or display 418, as well as a keyboard 410, pointing device 414, and/or audio input 424 and output 426. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Other Considerations

One possible embodiment has been described herein. Those of skill in the art will appreciate that other embodiments may likewise be practiced. First, the particular naming of the components and variables, capitalization of terms, the attributes, data structures, or any other programming or structural aspect is not mandatory or significant, and the mechanisms described may have different names, formats, or protocols. Also, the particular division of functionality between the various system components described herein is merely for purposes of example, and is not mandatory; functions performed by a single system component may instead be performed by multiple components, and functions performed by multiple components may instead be performed by a single component.

Some portions of the above description present the inventive features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects described herein include process steps and instructions in the form of an algorithm. It should be noted that the process steps and instructions could be embodied in software, firmware or hardware, and when embodied in software, could be downloaded to reside on and be operated from different platforms used by real time network operating systems.

The concepts described herein also relate to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the concepts described herein are not described with reference to any particular programming language. It is appreciated that a variety of programming languages may be used to implement the teachings as described herein, and any references to specific languages are provided for purposes of enablement and best mode.

The concepts described herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure is intended to be illustrative, but not limiting, of the scope of the concepts described herein, which are set forth in the below claims.

APPENDIX A

Appendix A contains four related code listings for a simple example: displaying the "Hello, world!" message in a static page hosted on the Amazon™ S3™ cloud storage system.

The document "schema.yaml" includes markup language defining the schema for a package named "xyz" that contains a simple component resource named "StaticPage" that contains HTML content.

The document "staticPage.go" includes procedural code in the "Go" programming language that provides the implementation of the "StaticPage" type declared in "schema.yaml". The implementation (among other things) creates a storage "bucket" in the Amazon S3 cloud storage system for a static index web page, defining the resources "StaticPageArgs" and "StaticPage" (data types) and "NewStaticPage" (a function).

The document "staticPage.ts" is a wrapper generated based on the "schema.yaml" schema and allowing the "StaticPage" component to be called from within the TypeScript procedural programming language.

Finally, the document "index.ts" contains example application code written in the TypeScript programming language that constructs an instance of the StaticPage component that displays the message "Hello, world!", using the SDK provided by "staticPage.ts".

schema.yaml

```
name: xyz
resources:
    xyz:index:StaticPage:
        isComponent: true
        inputProperties:
            indexContent:
                type: string
                description: The HTML content for index.html.
        requiredInputs:
            - indexContent
        properties:
            bucket:
                "$ref":
"/aws/v4.0.0/schema.json#/resources/aws:s3%2Fbucket:Bucket"
                description: The bucket resource.
            websiteUrl:
                type: string
                description: The website URL.
``` staticPage.go

```go
package provider
import (
    "github.com/pulumi/pulumi-aws/sdk/v4/go/aws/s3"
    "github.com/pulumi/pulumi/sdk/v3/go/pulumi"
)
// The set of arguments for creating a StaticPage component resource.
type StaticPageArgs struct {
    // The HTML content for index.html.
    IndexContent pulumi.StringInput `pulumi:"indexContent"`
}
// The StaticPage component resource.
type StaticPage struct {
    pulumi.ResourceState
    Bucket     *s3.Bucket          `pulumi:"bucket"`
    WebsiteUrl pulumi.StringOutput `pulumi:"websiteUrl"`
}
// NewStaticPage creates a new StaticPage component resource.
func NewStaticPage(ctx *pulumi.Context,
    name string, args *StaticPageArgs, opts ...pulumi.ResourceOption) (*StaticPage, error) {
    if args == nil {
        args = &StaticPageArgs{}
    }
    component := &StaticPage{}
    err := ctx.RegisterComponentResource("xyz:index:StaticPage", name, component, opts...)
    if err != nil {
        return nil, err
    }
    // Create a bucket and expose a website index document.
    bucket, err := s3.NewBucket(ctx, name, &s3.BucketArgs{
        Website: s3.BucketWebsiteArgs{
            IndexDocument: pulumi.String("index.html"),
        },
    }, pulumi.Parent(component))
    if err != nil {
        return nil, err
    }
    // Create a bucket object for the index document.
    if _, err := s3.NewBucketObject(ctx, name,
        &s3.BucketObjectArgs{
            Bucket:      bucket.ID(),
            Key:         pulumi.String("index.html"),
            Content:     args.IndexContent,
            ContentType: pulumi.String("text/html"),
        }, pulumi.Parent(bucket)); err != nil {
        return nil, err
    }
    // Set the access policy for the bucket so all objects are readable.
    if _, err := s3.NewBucketPolicy(ctx, "bucketPolicy",
        &s3.BucketPolicyArgs{
            Bucket: bucket.ID(),
            Policy: pulumi.Any(map[string]interface{}{
                "Version": "2012-10-17",
                "Statement": []map[string]interface{}{
                    {
                        "Effect":    "Allow",
                        "Principal": "*",
                        "Action":    []interface{}{
                            "s3:GetObject",
                        },
                        "Resource": []interface{}{
                            pulumi.Sprintf("arn:aws:s3:::%s/*", bucket.ID()), // policy refers to bucket name explicitly
                        },
                    },
                },
            }),
        }, pulumi.Parent(bucket)); err != nil {
        return nil, err
    }
    component.Bucket = bucket
    component.WebsiteUrl = bucket.WebsiteEndpoint
    if err := ctx.RegisterResourceOutputs(component, pulumi.Map{
        "bucket":     bucket,
        "websiteUrl": bucket.WebsiteEndpoint,
    }); err != nil {
        return nil, err
    }
    return component, nil
}
``` staticPage.ts

```typescript
// *** WARNING: this file was generated by Pulumi SDK Generator. ***
// *** Do not edit by hand unless you're certain you know what you are doing! ***
import * as pulumi from "@pulumi/pulumi";
import * as utilities from "./utilities";
import * as aws from "@pulumi/aws";
export class StaticPage extends pulumi.ComponentResource {
    /** @internal */
    public static readonly __pulumiType = 'xyz:index:StaticPage';
    /**
     * Returns true if the given object is an instance of StaticPage. This is designed to work even
     * when multiple copies of the Pulumi SDK have been loaded into the same process.
     */
    public static isInstance(obj: any): obj is StaticPage {
        if (obj === undefined || obj === null) {
            return false;
        }
        return obj['__pulumiType'] === StaticPage.__pulumiType;
    }
    /**
     * The bucket resource.
     */
    public /*out*/ readonly bucket!: pulumi.Output<aws.s3.Bucket>;
    /**
     * The website URL.
     */
    public /*out*/ readonly websiteUrl!: pulumi.Output<string>;
    /**
     * Create a StaticPage resource with the given unique name, arguments, and options.
     *
     * @param name The _unique_ name of the resource.
     * @param args The arguments to use to populate this resource's properties.
     * @param opts A bag of options that control this resource's behavior.
     */
    constructor(name: string, args: StaticPageArgs, opts?: pulumi.ComponentResourceOptions) {
        let inputs: pulumi.Inputs = {};
        opts = opts || {};
        if (!opts.id) {
            if ((!args || args.indexContent === undefined) && !opts.urn) {
                throw new Error("Missing required property 'indexContent'");
            }
            inputs["indexContent"] = args ? args.indexContent : undefined;
            inputs["bucket"] = undefined /*out*/;
            inputs["websiteUrl"] = undefined /*out*/;
        } else {
            inputs["bucket"] = undefined /*out*/;
            inputs["websiteUrl"] = undefined /*out*/;
        }
``` required:
- bucket
- websiteUrl

-continued

```
        if (!opts.version) {
            opts = pulumi.mergeOptions(opts, { version: utilities.getVersion ( )});
        }
        super(StaticPage.___pulumiType, name, inputs, opts, true /*remote*/);
    }
}
/**
 * The set of arguments for constructing a StaticPage resource.
 */
export interface StaticPageArgs {
    /**
     * The HTML content for index.html.
     */
    readonly indexContent: pulumi.Input<string>;
}
``` index.ts

```
import * as xyz from "@pulumi/xyz";
const page = new xyz.StaticPage("page", {
    indexContent: "<html><body><p>Hello world!</p></body></html>",
});
export const bucket = page.bucket;
export const url = page.websiteUrl;
```

APPENDIX B (i) Package Schema
Package

| Property | Type | Required | Description |
| --- | --- | --- | --- |
| name | string | Yes | Name is the unqualified name of the package (e.g. "aws", "azure", "gcp", "kubernetes", "random") |
| displayName | string | No | The human-friendly name of the package. |
| version | string | Yes | Version is the version of the package. The version must be valid semver. |
| description | string | No | Description is the description of the package. |
| keywords | array[string] | No | Keywords is the list of keywords that are associated with the package, if any. Reserved keywords can be specified that help with categorizing the package in the Pulumi registry. category/<name> and kind/<type> are the only reserved keywords at this time, where <name> can be one of: cloud, database, infrastructure, network, utility, vcs and <type> is either native or component. If the package is a bridged Terraform provider, then don't include a kind/label. |
| homepage | string | No | Homepage is the package's homepage. |
| license | string | No | License indicates which license is used for the package's contents. |
| attribution | string | No | Attribution allows freeform text attribution of derived work, if needed. |
| repository | string | No | Repository is the URL at which the source for the package can be found. |
| logoUrl | string | No | LogoURL is the URL for the package's logo, if any. |
| pluginDownloadURL | string | No | PluginDownloadURL is the URL to use to acquire the provider plugin binary, if any. See Authoring & Publishing for more details. |
| publisher | string | No | The name of the person or organization that authored and published the package. |
| meta | Metadata | No | Meta contains information for the importer about this package. |
| config | Config | No | Config describes the set of configuration variables defined by this package. |
| types | map[ComplexType] | No | Types is a map from type token to ComplexType that describes the set of complex types (ie. object, enum) defined by this package. |
| provider | Resource | No | Provider describes the provider type for this package. |
| resources | map[Resource] | No | Resources is a map from type token to Resource that describes the set of resources defined by this package. |
| functions | map[Function] | No | Functions is a map from token to Function that describes the set of functions defined by this package. |
| language | map[PackageLanguage] | No | Language specifies additional language-specific data about the package. |

Metadata
  Metadata for the importer about this package.

| Property | Type | Required | Description |
| --- | --- | --- | --- |
| moduleFormat | string | No | ModuleFormat is a regex that is used by the importer to extract a module name from the module portion of a type token. Packages that use the module format "namespace1/namespace2/.../namespaceN" do not need to specify a format. The regex must define one capturing group that contains the module name, which must be formatted as "namespace1/namespace2/...namespaceN" |

Config
  A package's configuration variables.

| Property | Type | Required | Description |
| --- | --- | --- | --- |
| variables | map[Property] | No | Variables is a map from variable name to Property that describes a package's configuration variables. |
| required | array[string] | No | Required is a list of the names of the package's required configuration variables. |

ObjectType
  An object type.

| Property | Type | Required | Description |
| --- | --- | --- | --- |
| description | string | No | Description is the description of the type, if any. |
| properties | map[Property] | No | Properties, if present, is a map from property name to Property that describes the type's properties. |
| type | string | No | Type must be "object" if this is an object type, or the underlying type for an enum. |
| required | array[string] | No | Required, if present, is a list of the names of an object type's required properties. These properties must be set for inputs and will always be set for outputs. |
| language | map[ObjectTypeLanguage] | No | Language specifies additional language-specific data about the type. |

ComplexType
  An object or enum type.

| Property | Type | Required | Description |
| --- | --- | --- | --- |
| All ObjectType properties, as well as: | | | |
| enum | array[EnumValue] | No | Enum, if present, is the list of possible values for an enum type. |

Resource
A Resource Description

| Property | Type | Required | Description |
| --- | --- | --- | --- |
| All ObjectType properties, as well as: | | | |
| inputProperties | map[Property] | No | Description is the description of the property, if any. |
| requiredInputs | array[string] | No | RequiredInputs is a list of the names of the resource's required input properties. |

-continued

| Property | Type | Required | Description |
| --- | --- | --- | --- |
| stateInputs | ObjectType | No | StateInputs is an optional ObjectType that describes additional inputs that may be necessary to get an existing resource. If this is unset, only an ID is necessary. |
| aliases | array[Alias] | No | Aliases is the list of aliases for the resource. |
| deprecationMessage | string | No | DeprecationMessage indicates whether or not the resource is deprecated. |
| language | map[ResourceLanguage] | No | Language specifies additional language-specific data about the resource. |
| isComponent | boolean | No | IsComponent indicates whether the resource is a ComponentResource. |
| methods | map[string]string | No | Methods maps method names to functions in this schema. |

Function
A Function Description.

| Property | Type | Required | Description |
| --- | --- | --- | --- |
| description | string | No | Description is the description of the function, if any. |
| inputs | ObjectType | No | Inputs is the bag of input values for the function, if any. |
| outputs | ObjectType | No | Outputs is the bag of output values for the function, if any. |
| deprecationMessage | string | No | DeprecationMessage indicates whether or not the function is deprecated. |
| language | map[FunctionLanguage] | No | Language specifies additional language-specific data about the function. |

Type
A Reference to a Type.

| Property | Type | Required | Description |
| --- | --- | --- | --- |
| type | string | Yes | Type is the primitive or composite type, if any. May be "boolean", "integer", "number", "string", "array", or "object". |
| $ref | string | Yes | Ref is a reference to a type in this or another document. For example, the built-in Archive, Asset, and Any types are referenced as "pulumi.json#/Archive", "pulumi.json#/Asset", and "pulumi.json#/Any", respectively. A type from this document is referenced as "#/types/pulumi:type:token". A type |

-continued

| Property | Type | Required | Description |
|---|---|---|---|
| | | | from another document is referenced as "path#/types/pulumi:type:token", where path is of the form: "/provider/vX.Y.Z/schema.json" or "pulumi.json" or "http[s]://example.com/provider/vX.Y.Z/schema.json". A resource from this document is referenced as "#/resources/pulumi:type:token". A resource from another document is referenced as "path#/resources/pulumi:type:token", where path is of the form: "/provider/vX.Y.Z/schema.json" or "pulumi.json" or "http[s]://example.com/provider/vX.Y.Z/schema.json". |
| additionalProperties | Type | No | AdditionalProperties, if set, describes the element type of an "object" (i.e. a string -> value map). |
| items | Type | No | Items, if set, describes the element type of an array. |
| oneOf | array[Type] | No | OneOf indicates that values of the type may be one of any of the listed types. |
| discriminator | Discriminator | No | Discriminator informs the consumer of an alternative schema based on the value associated with it. |
| plain | boolean | No | Plain indicates that when used as an input, this type does not accept eventual values. |

Property 30
An Object or Resource Property.

| Property | Type | Required | Description |
|---|---|---|---|
| All Type properties, as well as: | | | |
| description | string | No | Description is the description of the property, if any. |
| const | any | No | Const is the constant value for the property, if any. The type of the value must be assignable to the type of the property. |
| default | any | No | Default is the default value for the property, if any. The type of the value must be assignable to the type of the property. |
| defaultInfo | Default | No | DefaultInfo contains additional information about the property's default value, if any. |
| deprecationMessage | string | No | DeprecationMessage indicates whether or not the property is deprecated. |
| language | map[PropertyLanguage] | No | Language specifies additional language-specific data about the property. |
| secret | boolean | No | Secret specifies if the property is secret (default false). |
| replaceOnChanges | boolean | No | ReplaceOnChanges specifies if the associated object |

-continued

| Property | Type | Required | Description |
| --- | --- | --- | --- |
| willReplaceOnChanges | boolean | No | should be updated with a replace operation instead of a update operation. WillReplaceOnChanges indiciates that the provider will replace the resource when this property is changed. |

EnumValue
The Values Metadata Associated with an Enum Type.

| Property | Type | Required | Description |
| --- | --- | --- | --- |
| name | string | No | Name, if present, overrides the name of the enum value that would usually be derived from the value. |
| description | string | No | Description of the enum value. |
| value | any | No | Value is the enum value itself. |
| deprecationMessage | string | No | DeprecationMessage indicates whether or not the value is deprecated. |

Alias
An Alias Description.

| Property | Type | Required | Description |
| --- | --- | --- | --- |
| name | string | No | Name is the name portion of the alias, if any. |
| project | string | No | Project is the project portion of the alias, if any. |
| type | string | No | Type is the type portion of the alias, if any. |

Default
Extra Information about the Default Value for a Property.

| Property | Type | Required | Description |
| --- | --- | --- | --- |
| environment | array[string] | Yes | Environment specifies a set of environment variables to probe for a default value. |
| language | map[DefaultLanguage] | No | Language specifies additional language-specific data about the default value. |

Discriminator
Informs the consumer of an alternative schema based on the value associated with it.

| Property | Type | Required | Description |
| --- | --- | --- | --- |
| propertyName | string | Yes | PropertyName is the name of the property in the payload that will hold the discriminator value. |
| mapping | map[string] | No | Mapping is an optional object to hold mappings between payload values and schema names or references. |

(ii) Language-Specific Extensions

Several schema types contain a language field which is a map from a supported language to a language-specific schema type. The schema for this type is language dependent, and offers extensibility for language-specific SDK code generators to encode language-specific information about the schema entry.

PackageLanguage
   Language-specific information for a package.
   For node.js:

| Property | Type | Required | Description |
| --- | --- | --- | --- |
| packageName | string | No | Custom name for the NPM package. |
| packageDescription | string | No | Description for the NPM package. |
| readme | string | No | Readme contains the text for the package's README.md files. |

-continued

| Property | Type | Required | Description |
|---|---|---|---|
| dependencies | map[string] | No | NPM dependencies to add to package.json. |
| devDependencies | map[string] | No | NPM dev-dependencies to add to package.json. |
| peerDependencies | map[string] | No | NPM peer-dependencies to add to package.json. |
| resolutions | map[string] | No | NPM resolutions to add to package.json |
| typescriptVersion | string | No | A specific version of TypeScript to include in package.json. |
| moduleToPackage | map[string] | No | A map containing overrides for module names to package names. |
| compatibility | string | No | Toggle compatibility mode for a specified target. |
| disableUnionOutputTypes | boolean | No | Disable support for unions in output types. |
| containsEnums | boolean | No | An indicator for whether the package contains enums. |
| respectSchemaVersion | boolean | No | Use the package.version field in the generated SDK |
| pluginName | string | No | The name of the plugin, which might be different from the package name. |
| pluginVersion | string | No | The version of the plugin, which might be different from the version of the package. |

For Python:

| Property | Type | Required | Description |
|---|---|---|---|
| packageName | string | No | PackageName is an override for the name of the generated python package. |
| requires | map[string] | No | Description for the NPM package. |
| readme | string | No | Readme contains the text for the package's README.md files. |
| moduleNameOverrides | map[string] | No | Optional overrides for Pulumi module names. |
| compatibility | string | No | Toggle compatibility mode for a specified target. |
| respectSchemaVersion | boolean | No | Use the package.version field in the generated SDK. |

For go:

| Property | Type | Description |
|---|---|---|
| importBasePath | string | Base path for package imports. |
| rootPackageName | string | Explicit package name, which may be different to the import path. |

-continued

| Property | Type | Description |
|---|---|---|
| moduleToPackage | map[string] | Map from module -> package name. |
| packageImportAliases | map[string] | Map from package name -> package alias. |
| generateResourceContainerTypes | boolean | Generate container types (arrays, maps, pointer output types etc.) for each resource. These are typically used to support external references. |
| respectSchemaVersion | boolean | Use the package.version field in the generated SDK. |

For csharp:

| Property | Type | Required | Description |
|---|---|---|---|
| packageReferences | map[string] | No | |
| namespaces | map[string] | No | |
| compatibility | string | No | |
| dictionaryConstructors | boolean | No | |
| rootNamespace | string | No | The root namespace that the generated package should live under. This setting defaults to "Pulumi". |
| respectSchemaVersion | boolean | No | Use the package.version field in the generated SDK. |

For Java:

| Property | Type | Required | Description |
|---|---|---|---|
| packages | map[string] | No | Overrides for module names to Java package names. Example: "autoscaling/v1" -> "autoscaling.v1". |
| basePackage | string | No | Prefixes the generated Java package. This setting defaults to "com.pulumi". |
| build Files | string | No | Generates build files for the chosen build tool. Supported values: "gradle". |
| dependencies | map[string] | No | Java dependencies to use with the buildFiles. Example: "com.pulumi.gcp" -> "6.23.0". |

PropertyLanguage
 Language-specific info for a property.
 For csharp:

| Property | Type | Required | Description |
|---|---|---|---|
| name | string | No | |

What is claimed is:

1. A computer-implemented method for specifying a desired state configuration of cloud infrastructure, the method comprising:
  receiving, from a user:
    a schema specifying properties of a package implementing the schema, wherein:
      the schema is programming language-neutral,
      the specified properties comprise at least one of: a resource, or a function, and
      properties of the at least one of a resource or a function comprise:
        a set of output properties, and
        a list of which properties are required;
    a first package created in a procedural programming language and affecting a configuration state of a cloud-based software environment when executed, wherein the first package implements the schema;
  generating, based on the schema:
    first wrapper code for calling the first package in a first programming language, and
    second wrapper code for calling the first package in a second programming language,
  wherein the output properties are evaluated asynchronously and specify a dependency graph of resources from which the output properties were derived; and
  executing the first package using one of the first wrapper code or the second wrapper code, wherein executing the package causes one or more of creating or configuring one or more of a virtual host, storage, or a web page in the cloud infrastructure.

2. The computer-implemented method of claim 1, wherein the schema comprises attribute types including at least one of:
  type;
  repository;
  version;
  license; or
  configuration.

3. The computer-implemented method of claim 1, wherein the schema comprises an attribute type for specifying options for generating code in a given target programming language.

4. The computer-implemented method of claim 1, wherein the resources are units of the cloud infrastructure including at least one of compute instances, storage buckets, or Kubernetes clusters.

5. The computer-implemented method of claim 1, wherein at runtime output properties are evaluated asynchronously.

6. The computer-implemented method of claim 5, wherein asynchronous evaluation of the output properties comprises creating a dependency graph indicating inputs upon which outputs depend.

7. The computer-implemented method of claim 1, wherein the schema includes a property whose value includes a reference to a definition of a second schema.

8. A non-transitory computer-readable storage medium storing instructions that when executed by a computer processor perform actions for specifying a desired state configuration of cloud infrastructure, the actions comprising:
    receiving, from a user:
        a schema specifying properties of a package implementing the schema, wherein:
            the schema is programming language-neutral,
            the specified properties comprise at least one of: a resource, or a function, and
            properties of the at least one of a resource or a function comprise:
                a set of output properties, and
                a list of which properties are required;
        a first package created in a procedural programming language and affecting a configuration state of a cloud-based software environment when executed, wherein the first package implements the schema; and
    generating, based on the schema:
        first wrapper code for calling the first package in a first programming language, and
        second wrapper code for calling the first package in a second programming language,
    wherein the output properties are evaluated asynchronously and specify a dependency graph of resources from which the output properties were derived; and
    executing the first package using one of the first wrapper code or the second wrapper code, wherein executing the package causes one or more of creating or configuring one or more of a virtual host, storage, or a web page in the cloud infrastructure.

9. The non-transitory computer-readable storage medium of claim 8, wherein the schema comprises attribute types including at least one of:
    type;
    repository;
    version;
    license; or
    configuration.

10. The non-transitory computer-readable storage medium of claim 8, wherein the schema comprises an attribute type for specifying options for generating code in a given target programming language.

11. The non-transitory computer-readable storage medium of claim 8, wherein the resources are units of the cloud infrastructure including at least one of compute instances, storage buckets, or Kubernetes clusters.

12. The non-transitory computer-readable storage medium of claim 8, wherein at runtime output properties are evaluated asynchronously.

13. The non-transitory computer-readable storage medium of claim 12, wherein asynchronous evaluation of the output properties comprises creating a dependency graph indicating inputs upon which outputs depend.

14. The non-transitory computer-readable storage medium of claim 8, wherein the schema includes a property whose value includes a reference to a definition of a second schema.

15. A computer system comprising:
    a computer processor; and
    a readable storage medium storing instructions that when executed by the computer processor perform actions for specifying a desired state configuration of cloud infrastructure, the actions comprising:
        receiving, from a user:
            a schema specifying properties of a package implementing the schema, wherein:
                the schema is programming language-neutral,
                the specified properties comprise at least one of: a resource, or a function, and
                properties of the at least one of a resource or a function comprise:
                    a set of output properties, and
                    a list of which properties are required;
            a first package created in a procedural programming language and affecting a configuration state of a cloud-based software environment when executed, wherein the first package implements the schema; and
        generating, based on the schema:
            first wrapper code for calling the first package in a first programming language, and
            second wrapper code for calling the first package in a second programming language,
        wherein the output properties are evaluated asynchronously and specify a dependency graph of resources from which the output properties were derived; and
        executing the first package using one of the first wrapper code or the second wrapper code, wherein executing the package causes one or more of creating or configuring one or more of a virtual host, storage, or a web page in the cloud infrastructure.

16. The computer system of claim 15, wherein the schema comprises attribute types including at least one of:
    type;
    repository;
    version;
    license; or
    configuration.

17. The computer system of claim 15, wherein the schema comprises an attribute type for specifying options for generating code in a given target programming language.

18. The computer system of claim 15, wherein the resources are units of the cloud infrastructure including at least one of compute instances, storage buckets, or Kubernetes clusters.

19. The computer system of claim 15, wherein at runtime output properties are evaluated asynchronously.

20. The computer system of claim 19, wherein asynchronous evaluation of the output properties comprises creating a dependency graph indicating inputs upon which outputs depend.

* * * * *